(12) United States Patent
Perry (10) Patent No.: US 6,629,573 B1
(45) Date of Patent: Oct. 7, 2003

(54) AIR POWERED VEHICLE AND POWER PLANT FOR THE SAME

(76) Inventor: Robert L. Perry, 1575 W. County Rd. 325 East, North Vernon, IN (US) 47265

( * ) Notice: Subject to any disclaimer, the term of this patent is extended or adjusted under 35 U.S.C. 154(b) by 0 days.

(21) Appl. No.: 09/703,908

(22) Filed: Nov. 1, 2000

(51) Int. Cl.[7] .............................................. F15B 11/06
(52) U.S. Cl. ...................... 180/54.1; 180/165; 180/302; 60/407
(58) Field of Search .................. 180/165, 302, 180/54.1; 418/61.2; 60/407, 413, 415, 416, 414, 412, 325

(56) References Cited

U.S. PATENT DOCUMENTS

| | | | |
|---|---|---|---|
| 617,331 A | 1/1899 | Gillette | |
| 999,590 A | 8/1911 | Priestly | |
| 1,902,124 A * | 3/1933 | Halloran | 180/165 |
| 2,853,102 A | 9/1958 | Walker | |
| 3,430,651 A | 3/1969 | Jackoboice | |
| 3,688,859 A | 9/1972 | Hudspeth et al. | |
| 3,765,180 A * | 10/1973 | Brown | 60/370 |
| 3,774,634 A | 11/1973 | Bonney | |
| 3,847,058 A | 11/1974 | Manor | |
| 3,925,984 A * | 12/1975 | Holleyman | 60/370 |
| 3,980,152 A | 9/1976 | Manor | |
| 4,337,842 A * | 7/1982 | Spangler et al. | 180/302 |
| 4,355,508 A * | 10/1982 | Blenke et al. | 60/416 |
| 4,361,204 A * | 11/1982 | Earle | 180/302 |
| 4,370,857 A * | 2/1983 | Miller | 60/413 |
| 4,478,304 A * | 10/1984 | Delano | 180/165 |
| 4,524,679 A * | 6/1985 | Lyons | 98/40.02 |
| 4,596,119 A * | 6/1986 | Johnson | 60/407 |
| 4,769,988 A * | 9/1988 | Clark, Jr. | 60/370 |
| 4,798,053 A * | 1/1989 | Chang | 60/712 |
| 4,834,038 A * | 5/1989 | Montagni | 123/190 |
| 5,167,292 A | 12/1992 | Moiroux et al. | |
| 5,460,239 A * | 10/1995 | Jensen | 180/302 |
| 5,515,675 A * | 5/1996 | Bindschatel | 60/370 |
| 5,788,220 A * | 8/1998 | Meziere, Sr. | 251/341 |
| 5,957,234 A | 9/1999 | Manor | |
| 6,006,519 A * | 12/1999 | Hormell, Jr. | 60/407 |
| 6,044,924 A * | 4/2000 | Adli | 180/302 |
| 6,311,797 B1 * | 11/2001 | Hubbard | 180/165 |

* cited by examiner

Primary Examiner—Brian L. Johnson
Assistant Examiner—J. Allen Shriver
(74) Attorney, Agent, or Firm—Krieg DeVault Lundy, LLP (57) ABSTRACT

A new and improved air powered vehicle and power plant therefore which include an engine having an engine block and at least one cylinder therein. A piston is mounted for reciprocation within the cylinder and the cylinder is provided with an air inlet valve, and exhaust valve and an intake valve. The piston within the cylinder is connected to a crank shaft. The valves are also operatively connected to the crank shaft whereupon the valves are opened and closed in sequence as the crank shaft rotates whereby time blasts of air may be introduced into the cylinder through said air intake valve and air may be exhausted through the exhaust valve to rotate the crank shaft.

23 Claims, 6 Drawing Sheets

AIR POWERED VEHICLE AND POWER PLANT FOR THE SAME

BACKGROUND OF THE INVENTION

The present invention relates to a new and improved air powered vehicle and an air powered engine for such a vehicle, and more particularly to an air powered engine primarily driven by valve timed blasts of air delivered to the cylinders of a conventional internal combustion engine having modified cam shafts and timing mechanism to control the intake and exhaust valves in relation to the rotation of the crankshaft of the engine.

Air powered vehicles have been proposed in the past. Ever since the proliferation of internal combustion engines powered by fossil fuels, pollution has been a concern. One solution to the, pollution problem is an air powered vehicle. Such air powered vehicles have been deficient in the supply of compressed air. One such vehicle is disclosed in U.S. Pat. No. 3,847,058 and U.S. Pat. No. 3,390,152. Such air powered vehicles have as a prime deficiency an adequate supply of compressed air.

The air powered vehicle and power plant of the invention optimizes the use of compressed air by maintaining cylinders of an internal combustion engine in vacuum and utilizing minimal compressed air to drive the engine.

Another deficiency of such vehicles is that the vehicle's electrical system is not generally sufficient to drive air compressors of the size required, and thus, auxiliary power is necessary. It is therefore highly desirable to provide a new and improved air powered vehicle and an air powered engine therefore. It is also highly desirable to provide a new and improved air powered vehicle and an air powered engine therefore which operates on differential air pressure which can be sustained by the vehicle's electrical system. It is also highly desirable to provide a new and improved air powered vehicle and air powered engine therefore which has an adequate supply of compressed air. It is also highly desirable to provide a new and improved air powered vehicle and air powered engine therefore which operates on a differential air pressure which includes the use of air at super atmospheric pressure for injection into the cylinders of an engine which are maintained as sub atmospheric pressure.

Other air powered vehicles have been proposed which include compressed air storage tanks and exhaust and supply tanks which are extremely large and take up appreciable room in the vehicle. Such tanks may reduce the passenger carrying or cargo carrying capability of the vehicle. It is therefore highly desirable to provide a new and improved air operated vehicle in which the air storage and supply tanks do not appreciably decrease the passenger carrying or cargo carrying capability of the vehicle. It is also highly desirable to provide a new and improved air powered vehicle in which the air storage and supply tanks are part of the structural chassis of the vehicle.

In prior air powered vehicles, conventional 12 volt electrical systems including the starter motor, alternator voltage regulator and battery are overloaded by the operation of air compressors requiring auxiliary power to be regularly supplied to the system. It has always been the desire to reduce the need of compressed air and to provide an air powered vehicle and power plant therefore which can utilize a relatively conventional 12 volt electrical system and operate thereon much in the same way as do conventional fossil fueled engines and vehicles. It is therefore highly desirable to provide a new and improved air powered vehicle and a power plant therefore which can utilize a conventional 12 volt electrical system including a starter motor, a combined alternator and voltage regulator and a heavy duty truck battery. It is also highly desirable to provide a new and improved air powered vehicle and a power plant therefore which do not require air compressors.

Prior art compressed air powered engines have proposed sophisticated valving to accomplish timed blasts of air into each cylinder of the engine. Inasmuch as this timing system is an integral part of the operation of any engine, many times it is complex, comprises many small operative parts and being relatively expensive and costly unless manufactured in volume. Thus, it is highly desirable to provide a new and improved valving system for an air powered vehicle and power plant therefore which utilizes for the most part conventional parts. It is also highly desirable to provide a new and improved valving system for an air powered vehicle and power plant therefore which includes a modified cam shaft, lower timing gear, upper timing gear and a timing chain and valves to deliver a timed blast of air to each cylinder of the engine.

Finally it is highly desirable to provide a new and improved air powered vehicle and a power plant therefore having all of the above features.

SUMMARY OF THE INVENTION

It is therefore an object of the invention to provide a new and improved air powered vehicle and an air powered engine therefore.

It is also an object of the invention to provide a new and improved air powered vehicle and an air powered engine therefore which operates on differential air pressure which can be sustained by the vehicle's electrical system.

It is also an object of the invention to provide a new and improved air powered vehicle and an air powered engine therefore which has an adequate supply of compressed air.

It is also an objection of the invention to provide a new and improved air powered vehicle and air powered engine therefore which operates on a differential air pressure which includes the use of air at super atmospheric pressure for injection into the cylinders of an engine which are maintained as sub atmospheric pressure.

It is also an object of the invention to provide a new and improved air operated vehicle in which the air storage and supply tanks do not appreciably decrease the passenger carrying or cargo carrying capability of the vehicle.

It is also an object of the invention to provide a new and improved air powered vehicle in which the air storage and supply tanks are part of the structural chassis of the vehicle.

It is also an object of the invention to provide a new and improved air powered vehicle and a power plant therefore which can utilize a conventional 12 volt electrical system including a starter motor, a combined alternator and voltage regulator and a heavy duty truck battery.

It is also an object of the invention to provide a new and improved air powered vehicle and a power plant therefore which do not require air compressors.

It is also an object of the invention to provide a new and improved valving system for an air powered vehicle and power plant therefore which utilizes for the most part conventional parts.

It is also an object of the invention to provide a new and improved valving system for an air powered vehicle and power plant therefore which includes a modified cam shaft, lower timing gear, upper timing gear and a timing chain and valves to deliver a timed blast of air to each cylinder of the engine.

It is finally an object of the invention to provide a new and improved air powered vehicle and a power plant therefore having all of the above features.

In the broader aspects there is provided a new and improved air powered vehicle and power plant therefore which include an engine having an engine block and at least one cylinder therein. A piston is mounted for reciprocation within the cylinder and the cylinder is provided with an air inlet valve, and exhaust valve and an intake valve. The piston within the cylinder is connected to a crank shaft. The valves are also operatively connected to the crank shaft where upon the valves are opened and closed in sequence as the crank shaft rotates whereby time blasts of air may be introduced into the cylinder through said air intake valve and air may be exhausted through the exhaust valve to rotate the crank shaft.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIGS. 5A–J is a series of fragmentary diagrammatic views illustrating the valve timing system of the new and improved power plant for the air powered vehicle of the invention; and FIGS. 6A–J are a series of fragmentary diagrammatic views illustrating the air valve timing system of the new and improved power plant for the air powered vehicle of the invention.

DESCRIPTION OF A SPECIFIC EMBODIMENT

Figure 1:
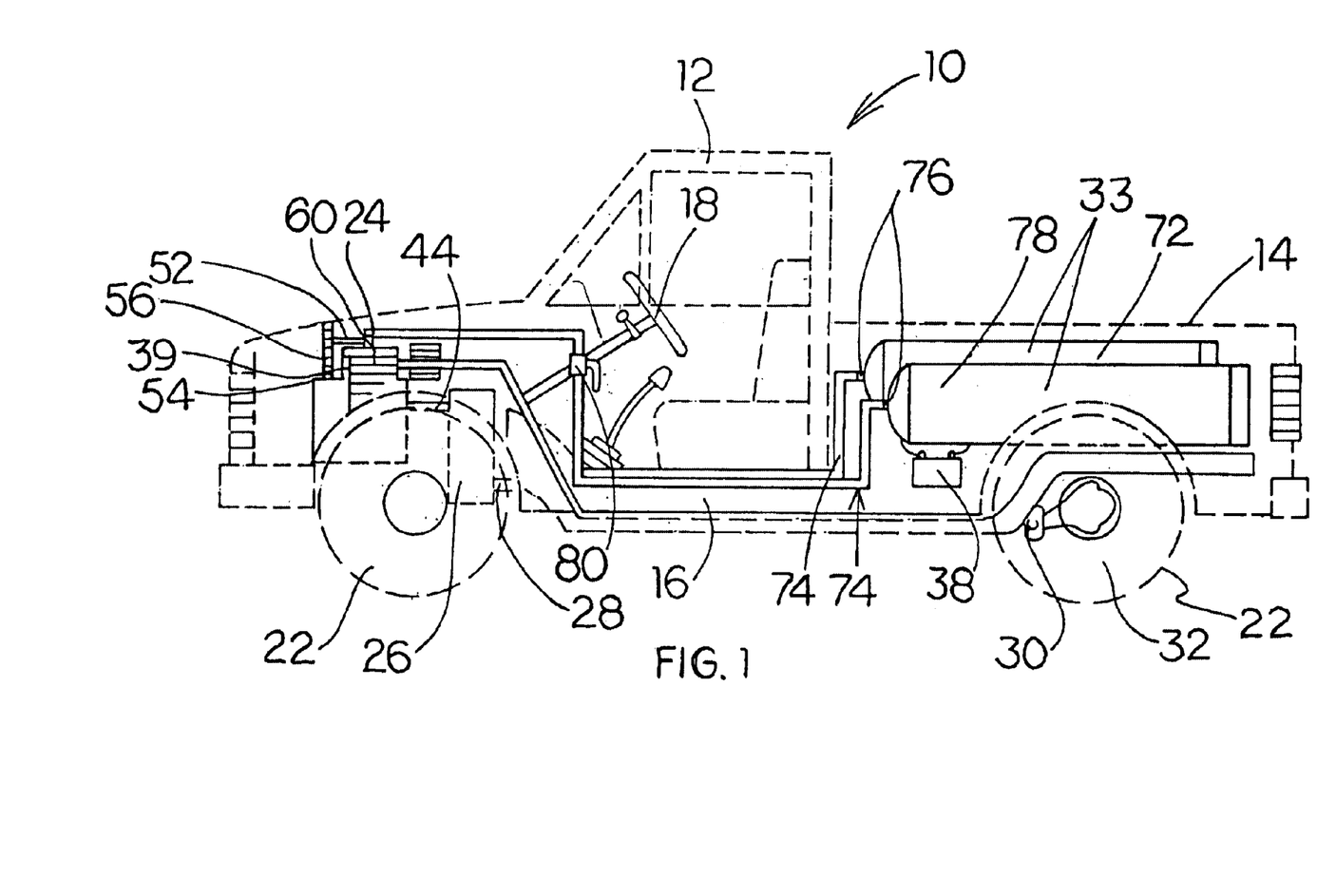
FIG. 1 is a side view of the new and improved air powered vehicle and the power plant therefore of the invention in the form of a pick-up truck with the body illustrated in dash lines.
Figure 2:
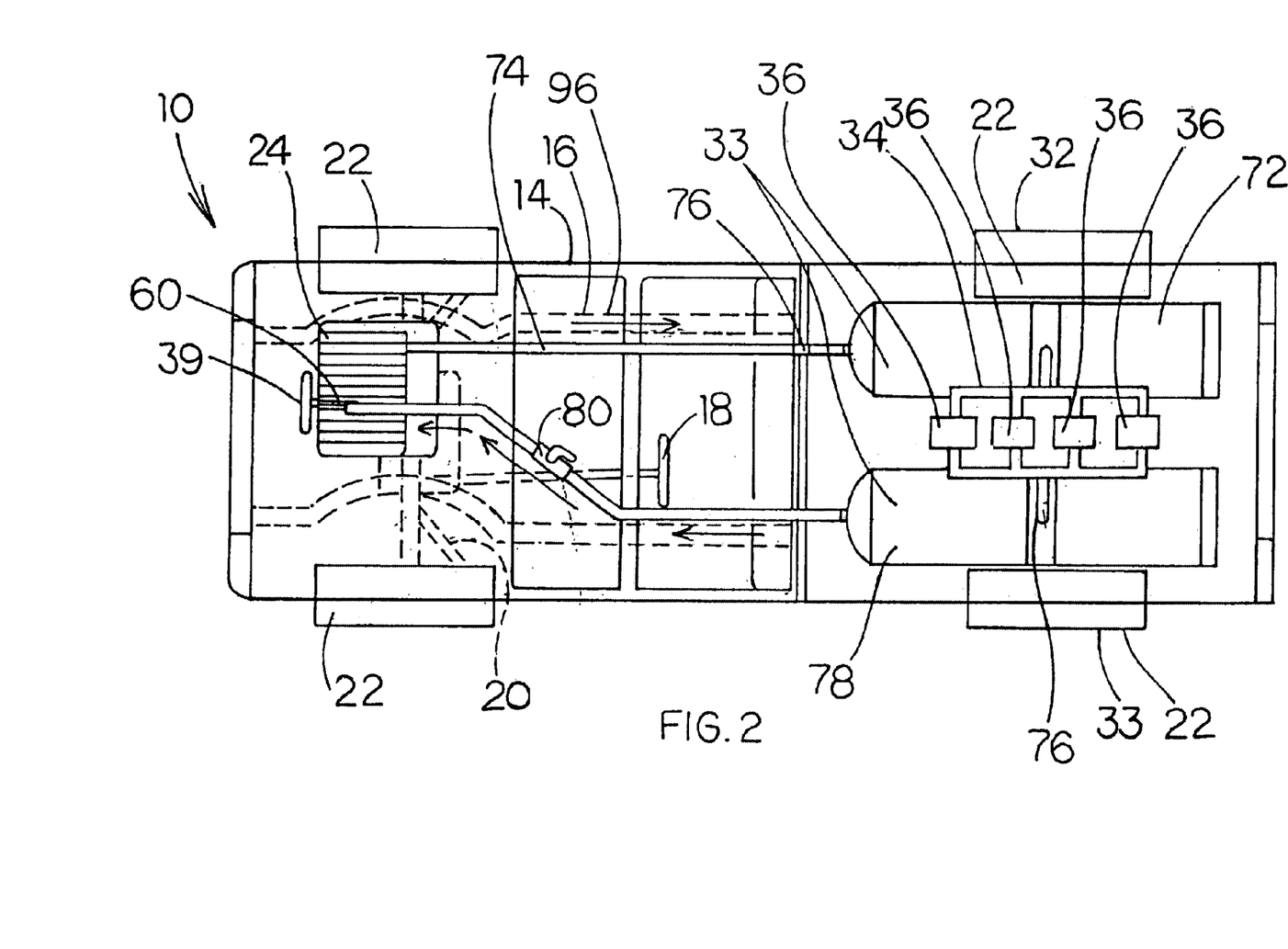
FIG. 2 is a top view of the new and improved air powered vehicle and the power plant therefore with the body and frame illustrated in dashed lines.

Referring to FIGS. 1 and 2, the new and improved vehicle 10 of the invention is shown to include a body 14 having a dab 12 supported on a conventional chassis 16 on a conventional suspension system (not shown) and a plurality of wheels 22. At the front end of the chassis 16 the wheels 22 are supported on a conventional steering linkage 20 (shown in FIG. 2) which is operatively connected to a conventional steering wheel 18. Supported on the chassis 16 is a conventional internal combustion gasoline engine 24 which has been modified as will be described hereinafter. Engine 24 is operatively connected to a conventional drive train 28 including a conventional transmission 26 and a conventional differential 30 between the rear drive wheels 32.

To the rear of the cab 12 there are positioned air tanks 33 spaced apart by a manifold 34 having a plurality of spaced apart vacuum pumps 36 operatively connected between the tanks. These tanks 33 and the manifold 34 are shown to be mounted within the body 14. In the specific embodiment illustrated tanks 33 are mounted between the frame members just beneath a pick-up truck bed. In other versions, these tanks 33 and manifold 34 are part of the vehicle frame. These tanks 33 and the manifold 34 and their connection to the engine 24 will be described in more detail hereinafter.

Vehicle 10 has a conventional electrical system to which the vacuum pumps 36 as well as the radio, the lights, starter motor and other conventional accessories are connected. The electrical system includes a belt driven generator and alternator (not shown) and a 12 volt storage battery 38. While the storage battery 38 is illustrated in a position beneath the air tanks, in a specific embodiment, there is no reason why the storage battery 38 cannot be positioned in its conventional position adjacent the engine 24.

Figure 3:
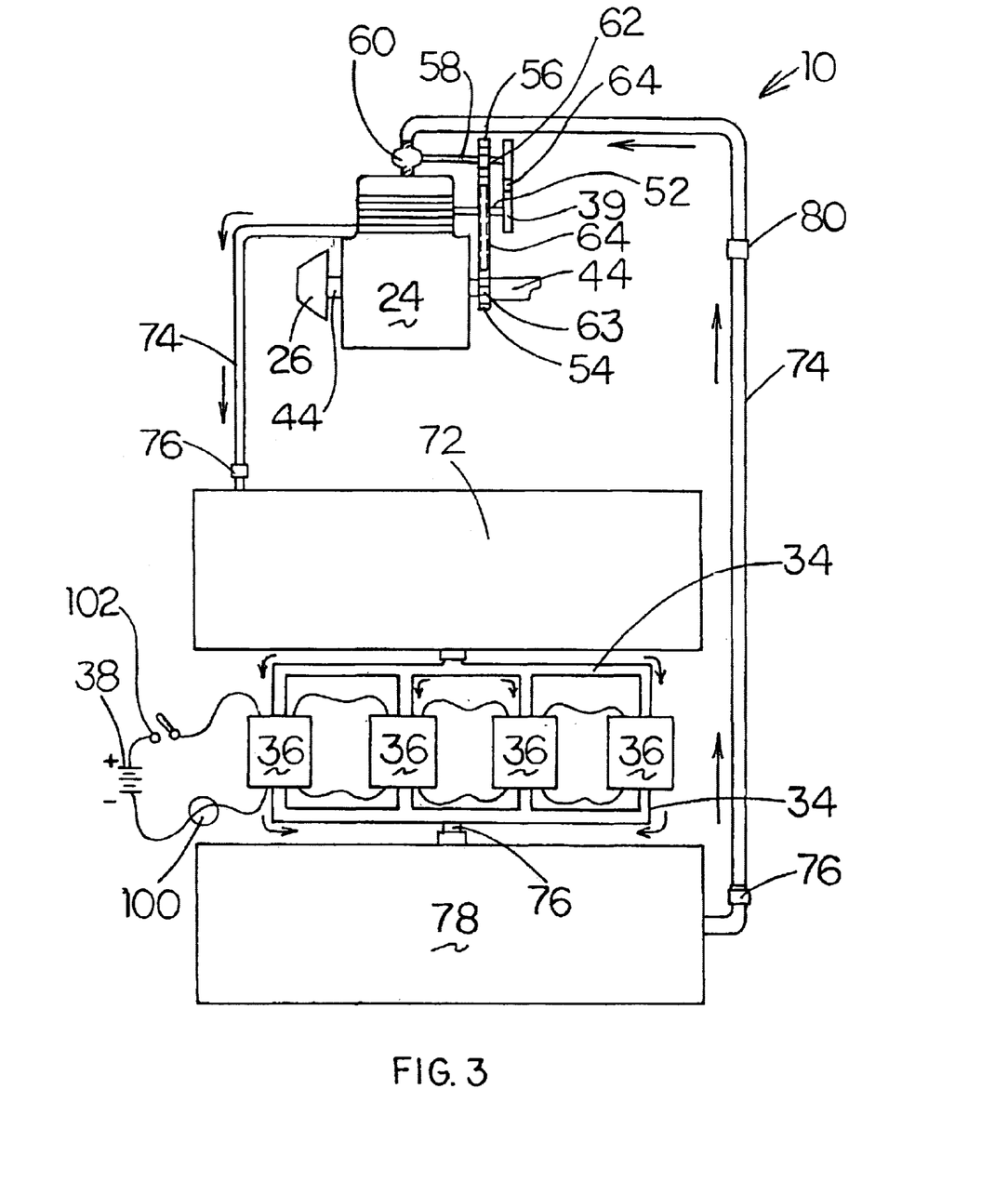
FIG. 3 is a diagrammatic view of the new and improved power plant of the invention.
Figure 5:
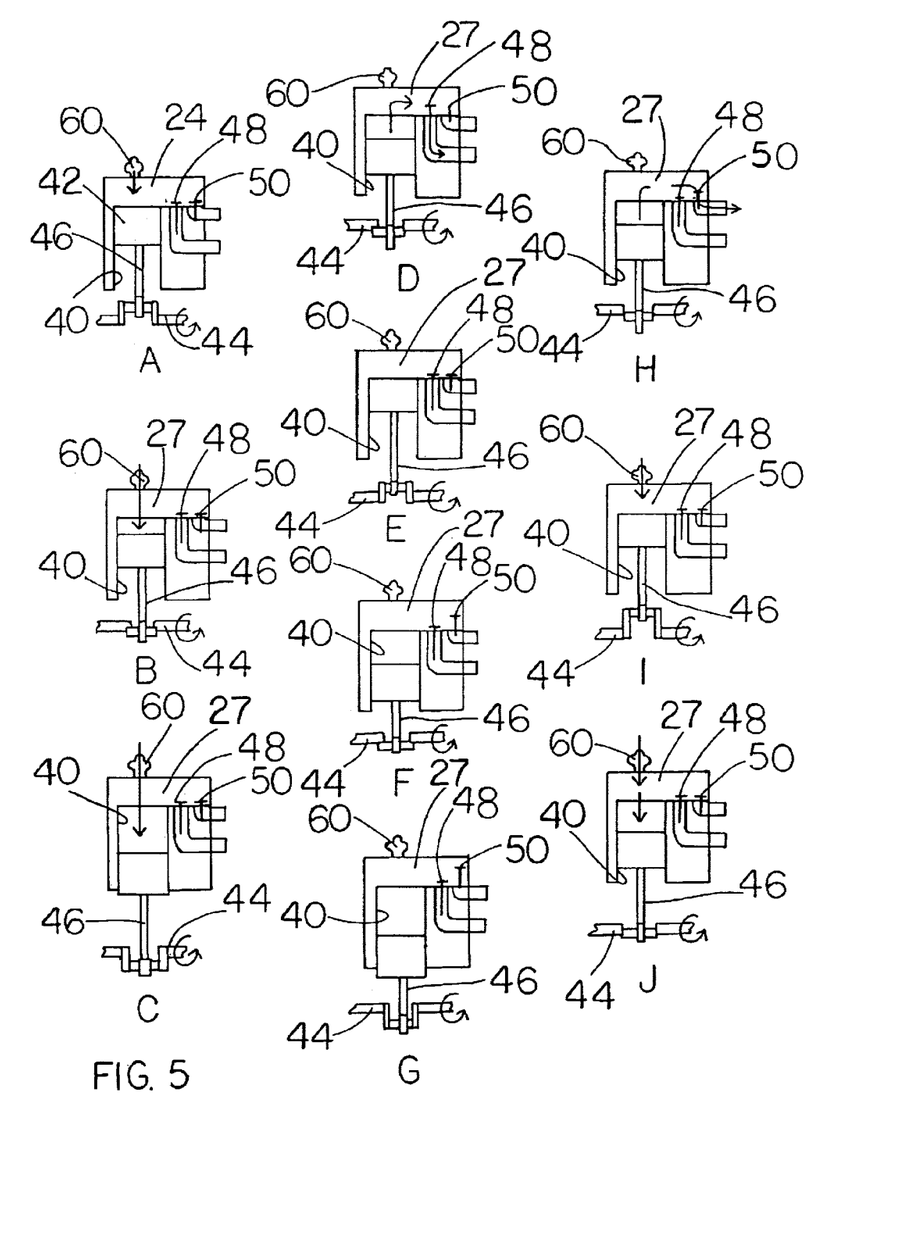
Figure 6:
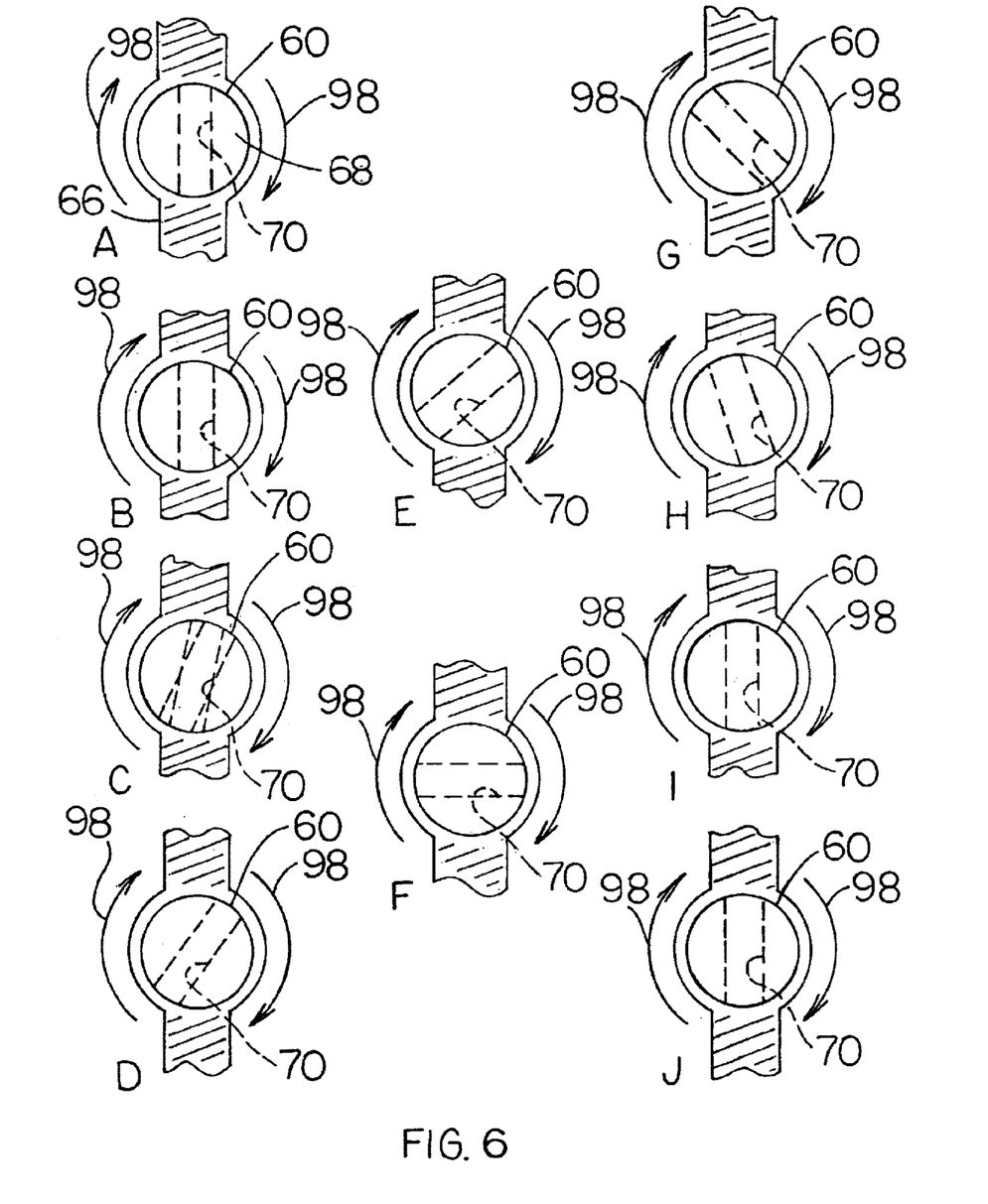

Referring to FIGS. 3, 5 and 6, there is shown a diagrammatic and simplified version of the invention including a one cylinder conventional internal combustion engine 24 modified in accordance with the invention. The modification of a conventional internal combustion engine consists of only two basic modifications. The first is the modification of the valve timing gears and the cam shaft of the engine 24 and the replacement thereof with new mechanism 39 between the crank shaft and the cam shaft and the second is the replacement of the carburetor with an air valve 60 which is driven with the cam shaft by the timing mechanism 39 from the crank shaft of the engine 24 as will be explained hereinafter more fully. In FIG. 3, this timing mechanism 39 is shown externally of the engine, however, in an actual embodiment of the invention, the timing mechanism will be internal of the engine as is conventional. Of course, all of the environmental emission control mechanisms can be deleted.

Engine 24 has a conventional cylinder 40 with a conventional piston 42 therein mounted for reciprocation on a conventional crank shaft 44 by a conventional connecting rod 46. The cylinder 40 has a conventional exhaust valve 48 and a conventional intake valve 50. These valves are operated by a conventional cam shaft 52.

The timing mechanism above mentioned consists of a lower timing gear 54 secured to the crank shaft 44 and upper timing gear 56 operatively connected to a shaft 58 connected to the ball valve 60. Shaft 58 also has an upper timing gear 62 which is operatively connected to the timing gear 63 secured the conventional cam shaft 52 of the engine 24. Each of these gears are preferably operatively connected by chains 64 (as shown) or by the gears being actually meshed one to the other or in any other manner to minimize any "play" therebetween. Air valve 60 is shown as a ball valve having a body 66, a valve 68, therein in which there is a bore 70. In other embodiments, air valve 60 may be a cylindrical valve or any other appropriate valve. As the crank shaft 44 is rotated, lower timing gear 54 is rotated which in turn rotates the upper timing gear 56 which rotates the timing shaft 58 which rotates the sphere 60 within the valve body 66 of the valve 60 and the timing gears 54 and 56 and the cam shaft 52 to operate the valves 48, 50 in accordance with the timing set forth in FIGS. 5 and 6.

The exhaust valves 48 are connected to the exhaust and vacuum tank 72 by piping 74 in which a one way check valve 76 is positioned. In a multi-cylinder engine, piping 74 is connected to the exhaust manifold 82 of the engine 24.

Exhaust and vacuum tank 72 is connected through the manifold 34 and the plurality of vacuum pumps 36 to the main storage tank 78. The main storage tank 78 is connected to the ball valve 60 via the piping 74 in which a one way check valve 76 is positioned. Between the one way check valve 76 and the ball valve 60 is positioned a speed control valve 80 which is positioned adjacent the steering wheel 18. It is by this valve 80 that the speed of the engine 24 is controlled. Valve 80, thus, may called the accelerator valve.

Figure 4:
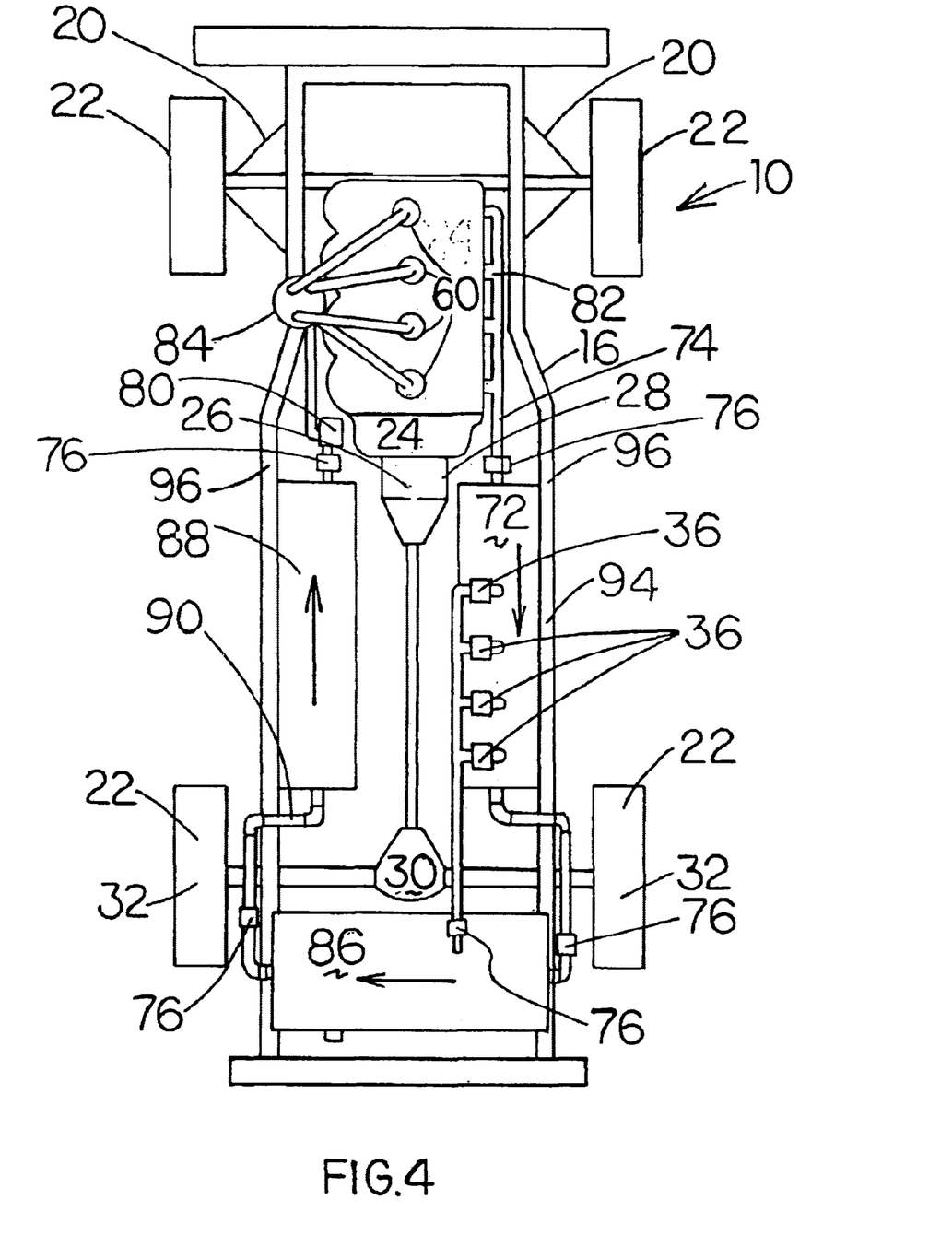
FIG. 4 is a diagrammatic view similar to FIG. 3 showing a modified version of the new and improved power plant for an air powered vehicle having four cylinders.

Referring to FIG. 4, there is shown multi-cylinder version of the invention. In this multi-cylinder version, like parts are given like reference numerals. The engine 24 shown is a four cylinder engine having an exhaust manifold 82 and an air distributor 84. Air distributor 84 includes a valve 60 for each of the cylinders of the engine. Further, because of the necessity for more air and the lack of space for air tanks, the main storage tank 78 is split into two tanks 86 and 88 connected by a line 90 in which there is installed a one way check valve 76. Other than the above, the mechanism is identical but for size in both the single cylinder version and the four cylinder version. Any conventional four cylinder engine 24, transmission 26 and drive train 28 can be utilized in accordance with this invention.

Also illustrated in FIG. 4 is the mounting of the storage tanks between the chassis members 94. In this version, the air tanks 33, 72, 78, 86, 88 may be utilized as part of the structural frame.

In a specific embodiment, the single cylinder horsepower engine 10 is a single cylinder with a piston 3 9/16 inches in diameter and a stroke of 2½ inches, each of the tubing 74, 90 connecting the engine 24 to the exhaust and vacuum tank 72 and the main storage tank 78 is ¾ inch tubing, and both the exhaust and vacuum tank 72 and the main storage tank 78 are conventional 60 gallon tanks. While the engine is operable utilizing 20 gallon tanks or tanks having a volume of about 120 times the engine displacement, it is preferable to store more air such that the vacuum pumps do not have to run continuously. With 60 gallon tanks (a volume of about 360 times the engine displacement), the vacuum pumps need only run approximately one-third of the time that the vehicle is operational. As above mentioned, the size of the tanks 72, 80 can be scaled proportionally to the displacement of the engine when upgrading the single cylinder engine 24 to a four cylinder engine 24 or a six cylinder engine 24 or a V8 engine 24 as desired. Similarly, the number of vacuum pumps 36 may also vary. Only one vacuum pump 36 having a capacity of 6.9 cfm at 90 pounds is needed with the single cylinder engine 10 of the invention. The number of pumps 36 and capacity means needs to be increased proportionally to the engine displacement to maintain an operating pressure differential of about 20 psig, i.e., about +10 psig to about −10 psig, in each cylinder.

In operation, the new and improved air powered vehicle 10 of the invention in a parked condition will have the accelerator valve 80 turned off and the ignition key will be turned off. In order to start the engine, the transmission 26 is placed in neutral or park and the ignition key is turned on which turns on the vacuum pumps 36. Gages in the dashboard will indicate when the exhaust tank 72 reaches an appropriate pressure differential for starting. This pressure differential necessary for starting is about 15 to about 20 psig. The starter motor is then engaged to move at least one of the cylinders to top dead center. The accelerator valve 80 is then opened starting the engine 24. Once the engine is started, the car is shifted into gear and the accelerator valve 80 is opened further to place the car into motion. With a standard transmission, as the car increases in speed, the gears can be shifted from first, second to third and overdrive as desired for additional speed. Automatic transmissions can also be used. The top speed of the air powered vehicle of the invention 10 utilizing a single cylinder engine having a brake horse power of about 10 horse power at 1700 rpm will power a vehicle up to about 30 to 40 miles per hour. Larger engines will allow the vehicle to obtain higher speeds.

Referring to FIGS. 5 and 6, the various positions of the pistons of each of the cylinders 40 of the engine 24 and the air valve 60 associated with that cylinder 40 are shown. In FIGS. 5A and 6A, the piston 42 is shown at top dead center with both the intake valve 50 and exhaust valve 48 closed. The valve 60 however is open allowing air to enter the cylinder 40 and to force the piston 42 downwardly. As the piston 42 moves downwardly, the sphere 68 of the valve 60 moves clockwise as indicated by the arrows 98 into a partially closed position as illustrated in FIG. 6C. In FIG. 5C, the piston is in bottom dead center with the exhaust 48 and intake valves 50 closed. The piston 42 then moves upwardly, with the valve 60 being closed as shown in FIG. 5D and the intake valve 50 closed and exhaust valve 48 open. With the valve 60 still in a closed position, as shown in FIG. 6E, the piston approaches top dead center and the intake valve opens and exhaust valve 48 closes. The intake valve 60 remains closed. See FIG. 5E. The valve 60 remains closed and the piston 42 reaches top dead center with both the intake valve 50 and the exhaust valve 48 closed. See FIGS. 5E and 6E. The exhaust valve 48 remains closed and the intake valve 50 opens as the piston descends sucking air into the cylinder. See FIGS. 5F and 6F. The piston continues its motion with valve 60 closed, the intake valve 50 remains open and the exhaust valve 48 remains closed until it reaches bottom dead center as shown in FIGS. 5G and 6G. When the piston 42 reaches bottom dead center, the intake valve 50 remains open and the exhaust valve 48 remains closed and the piston 42 starts upwardly exhausting air through the intake valve 50 as shown in FIGS. 5H and 6H. When the piston, 42 reaches top dead center, valve 60 is opened, the intake valve 50 is closed and the exhaust valve 48 is closed and air is forced into the cylinder forcing the piston downwardly as shown in FIGS. 5I and 6I and the cycle repeats itself as shown in FIGS. 5J and 6J continuing through the same cycle as illustrated in FIGS. 5A-I and 6A-I.

In this manner, the piston 42 reciprocates and the engine 24 drives the crank shaft 44 of the engine. The output of the crank shaft 44 is transferred to the transmission 26. The speed at which the engine 24 operates is controlled by the accelerator valve 80. All of the air exhausts through the exhaust valve 48 are returned to the main storage tank through the check valve 76. All of the air exhausted through the intake valve 50 is compressed between the check valve 76 and the valve 60. When the valve 60 opens, compressed air then expands into the cylinder 40 driving the piston 42 downwardly once again. The speed at which the engine 24 rotates is totally controlled by the accelerator valve 80. The speed at which the car is propelled forwardly or rearwardly depends upon what gear the transmission 26 is in as with a conventional vehicle.

As the engine 24 rotates, the generator rotates as with a conventional vehicle charging the battery 38. The alternator and the encompassed voltage regulator maintain the electrical system at 12 volts to supply power to the vacuum pumps 36 and the lights and the other accessories of the vehicle. There is no necessity to cool the engine, nor for the engine to have a starter motor. The cooling system, however, can be utilized to maintain the engine and the engine oil at a reasonable temperature during winter months. Alternatively, a crank case heater as used with diesel vehicles may be used instead of the cooling system. As disclosed, a new and improved air powered vehicle and air powered power plant 24 therefore is provided which operates on differential air pressure which can be sustained by the vehicle's power system. The new and improved air powered vehicle 10 incorporates air storage and supply tanks 33 that do not appreciably decrease the passenger carrying or cargo carrying capability of the vehicle and can totally function with a conventional 12 volt vehicle electrical system. The air storage and supply tanks 33 can be provided as part of the structural chassis 16 of the vehicle 10. The new and improved air powered vehicle 10 does not require any air compressors or the like and utilizes for the most part conventional parts.

What is claimed is:

1. A vehicle power plant comprising a four-stroke cycle engine having an engine block with at least one cylinder therein, a piston mounted for reciprocation within said cylinder, said cylinder having an inlet valve and exhaust and intake valves, said piston being operatively connected to a crankshaft, said valves being operatively connected to said crankshaft, said valves being opened and closed in sequence as said crankshaft rotates, said inlet and intake valves introducing timed blasts of an expandable gas at super atmospheric pressures into said cylinder through said inlet valve and exhausted through said exhaust and intake valves to rotate said crankshaft in a four stroke cycle.

2. The power plant of claim 1 wherein said inlet valve has a housing and a valve therein, said inlet valve having a bore extending therethrough, said housing having an inlet and an outlet diametrically opposed to each other, said bore being aligned with said inlet and outlet every 180° of rotation of said valve.

3. The power plant of claim 2 wherein said inlet valves is a sphere contained within a housing, said sphere rotates within a spherical cavity of said housing.

4. The power plant of claim 2 wherein said inlet valve is operatively connected to the crankshaft of said power plant, said inlet valve continually rotates as said crankshaft rotates, said valve being aligned with said inlet and outlet every 180° of rotation of said valve.

5. The power plant of claim 4 wherein said inlet is aligned with said inlet and outlet every two complete rotations of said crankshaft.

6. The power plant of claim 4 wherein said inlet valve rotates one complete revolution every four complete revolutions of said crankshaft.

7. The power plant of claim 4 wherein said exhaust valve opens every two complete rotations of said crankshaft.

8. The power plant of claim 4 wherein said intake valve opens every two complete rotations of said crankshaft.

9. The power plant of claim 1 wherein said engine has a plurality of cylinders, each cylinder having a piston mounted for rotation therein, said each cylinder having an intake valve and an exhaust valve operatively connected thereto, said piston being connected to said crankshaft, said valves being operatively connected to said crankshaft, said valves being opened and closed in sequence as said crankshaft rotates, said inlet valve introduces timed blasts of an expandable gas into each of said cylinders in sequence and exhausted to rotate said crankshaft in a four-stroke cycle.

10. The power plant of claim 1 further comprising an air supply having an air tank, at least one vacuum pump operatively connected to said air tank, said tank being connected between said intake and exhaust valves and said inlet valve, a one-way check valve being positioned between said inlet valve and said tank and said intake and exhaust valves and said tank, respectively.

11. The power plant of claim 10 wherein said air supply includes two air tanks, said air tanks being separated by a manifold having a plurality of vacuum pumps attached thereto, said manifold having an inlet operatively connected to one of said tanks and an outlet operatively connected to the other of said tanks, a plurality of vacuum pumps operatively connected to said manifold between said manifold inlet and manifold outlet, an electrical system having a storage battery, said vacuum pumps being connected in parallel to said storage battery of said electrical system.

12. The power plant of claim 11 wherein said air tanks have a volume of greater than 120 times the per cubic inches of displacement of said cylinders.

13. The power plant of claim 11 wherein said air tanks are maintained at approximately 130 PSIG.

14. The power plant of claim 10 wherein said air tank comprises a vacuum return tank, a main storage tank and an inline supply tank, said tanks are each operatively connected to each other with a one-way valve therebetween, said inline supply tank being connected to said inlet valve with an accelerator valve therebetween, said main storage tank being connected between said vacuum return tank and said air supply tank, said vacuum return tank being connected between said main storage tank and said intake and exhaust valves.

15. The power plant of claim 10 further comprising a vehicle electrical system operatively connected to said vacuum pump, said vehicle electrical system including a generator and a voltage regulator and a storage battery, said generator being operatively connected to said power plant, said generator and storage battery being sized in proportion to the power requirements of said vacuum pump to maintain said storage battery in a charged condition by said generator while said crankshaft of said power plant is rotating.

16. The power plant of claim 10 further comprising a vehicle chassis and a steering linkage with a steering wheel and a transmission, said power plant mounted on said chassis, said air supply mounted on said chassis, said chassis having a plurality of wheels and a vehicle suspension being mounted between said chassis and said wheels, a steering linkage operatively connected between at least one wheel and said chassis, a steering wheel connected to said steering linkage, a transmission secured to said power plant and operatively connected to at least one of said wheels.

17. A vehicle power plant comprising a four-stroke cycle engine having an engine block with at least one cylinder therein, a piston mounted for reciprocation within said cylinder, said cylinder having an inlet valve through which an expandable gas can be introduced into said cylinder and an exhaust valve, said piston being operatively connected to a crankshaft, said valves being operatively connected to said crankshaft, said valves being opened and closed in sequence as said crankshaft rotates, said inlet valve introducing timed blasts of an expandable gas at super atmospheric pressures into said cylinder through said inlet valve and exhausted through said exhaust valve to rotate said crankshaft in a four-stroke cycle, said inlet valve having a housing and a valve therein, said inlet valve having a bore extending therethrough, said housing having an inlet and an outlet diametrically opposed to each other, said bore being aligned with said inlet and outlet every 180 degrees of rotation of said valve.

18. The power plant of claim 17 wherein said inlet valve is operatively connected to the crankshaft of said power plant, said, inlet valve continually rotates as said crankshaft rotates, said inlet valve being aligned with said inlet and outlet every 180° of rotation of said valve.

19. The power plant of claim 18 wherein said inlet valve is aligned with said inlet and outlet every two complete rotations of said crankshaft.

20. The power plant of claim 18 wherein said inlet valve rotates one complete revolution every four complete revolutions of said crankshaft.

21. The power plant of claim 18 wherein said exhaust valve and said intake valve open every two complete rotations of said crankshaft.

22. The power plant of claim 17 wherein said engine has a plurality of cylinders, each cylinder having a piston mounted for rotation therein, said each cylinder having an intake valve and an exhaust valve operatively connected thereto, said piston being connected to said crankshaft, said valves being operatively connected to said crankshaft whereupon said valves open and close in sequence as said crankshaft rotates, said inlet valve introduces a timed blast of an expandable gas into each of said cylinders in sequence through said inlet valve and exhausted through said exhaust valve to rotate said crankshaft in a four stroke cycle.

23. The power plant of claim 17 further comprising an air supply having an air tank, at least one vacuum pump operatively connected to said air tank, said air tank being connected between said inlet and exhaust valves, a one way check valve being positioned between said inlet valve and said tank and said exhaust valve and said tank, respectively.

* * * * *